W. W. SENN.
NUT LOCK.
APPLICATION FILED APR. 10, 1909.
941,959.
Patented Nov. 30, 1909.
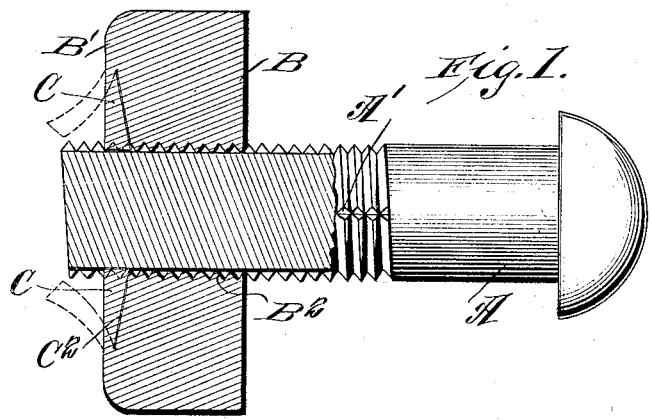
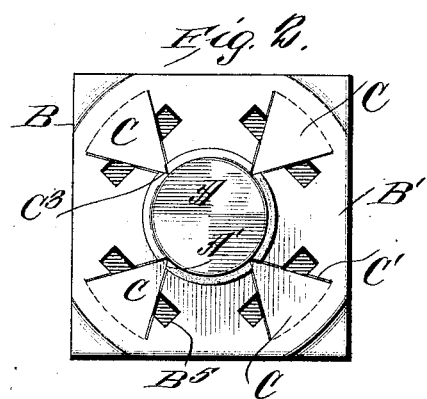
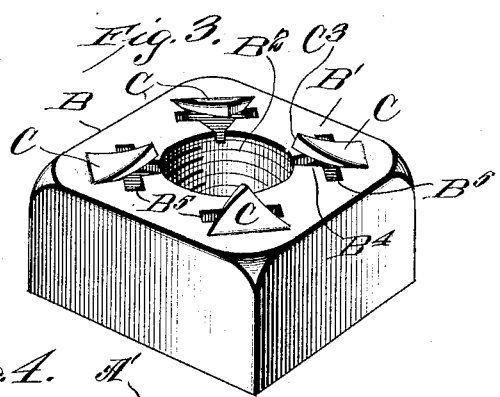
WITNESSES
E. M. Callaghan
Perry B. Turpin
INVENTOR
WALTER W. SENN
BY Munn & Co.
ATTORNEYS

UNITED STATES PATENT OFFICE.

WALTER W. SENN, OF MUNSON STATION, PENNSYLVANIA.

NUT-LOCK.

941,959.  Specification of Letters Patent.  Patented Nov. 30, 1909.

Application filed April 10, 1909. Serial No. 489,120.

*To all whom it may concern:*

Be it known that I, WALTER W. SENN, a citizen of the United States, and a resident of Munson Station, in the county of Clearfield and State of Pennsylvania, have made certain new and useful Improvements in Nut-Locks, of which the following is a specification.

This invention is an improvement in nut locks and has for an object to provide a novel construction which will be inexpensive and will efficiently serve the purpose for which it is designed, and which can be used to lock the nut positively on the bolt and in the use of which the locking devices can be readily adjusted to unlocked position to permit the turning of the nut on the bolt without injury thereto when desired to turn the nut farther on the bolt, or off the bolt if so desired; and the invention consists in certain novel constructions and combinations of parts as will be hereinafter described and claimed.

In the drawing Figure 1 is a sectional side view of my invention as in use. Fig. 2 is an end view thereof. Fig. 3 is a detail perspective view of the nut, and Fig. 4 is a cross section of the bolt.

The bolt A, may in general respects, be of ordinary construction, but is shown provided with a number of longitudinally V-shaped grooves $A'$, extending across its threads, any suitable number of the grooves being employed.

The nut B is in general respects, of ordinary construction and may be of any suitable metal, such for instance as metal from which wire nails are made so the parts to be bent as hereinafter described may be readily bent into and out of locking position without breaking.

In the outer face $B'$ of the nut and formed integral therewith are locking tongues C whose outer ends are integral with the body of the nut and whose inner ends extend into the bore $B^2$ of the nut to enter the grooves $A'$ in the bolt or to form such grooves or seats in a bolt should the latter not be provided with the grooves. The tongues or spurs C are of a special construction tapering from their outer to their inner ends converging on their outer sides at $C'$ toward the center, while the under faces at $C^2$ of the tongues or spurs are sloped gradually decreasing in thickness toward their outer ends so that they are of a maximum thickness at their inner ends or points $C^3$, thus affording a greater strength at such ends, and are of a minimum thickness at their outer ends where they are bent in operation. As shown in full lines in Fig. 3, and indicated in dotted lines Fig. 1, the barbs or spurs are curved from end to end and prior to the locking operation stand clear of or outside of the line of the bore $B^2$ of the nut so that the nut may be turned freely on the bolt when the spurs are as indicated in dotted lines, Fig. 1, and as shown in full lines Fig. 3, and when the nut has been turned home the spurs are curved outwardly from the face $B'$ of the nut and may be hammered in by any suitable tool to the full line position shown in Figs. 1 and 2, with their inner ends or points engaging the bolt and locking the nut from turning. In forming the spurs C corresponding recesses are produced at $B^4$ in the outer face $B'$ of the nut B and are in communication with the bore $B^2$ of the nut. To facilitate releasing the spurs or tongues, I provide slots $B^5$ extending laterally from the recesses $B^4$ about midway between the ends thereof and adapted to receive a suitable punch or other instrument by which the tongues may be bent or readjusted from the full line position shown in Fig. 1 to the dotted line position indicated in the same figure, when it is desired to release the nut from the bolt.

The construction is simple, inexpensive, avoids any separate attached parts for locking the nut, and provides the entire nut, bolt and locking devices in the two parts as shown and before described.

I claim—

1. In a nut lock the combination of a bolt having longitudinal grooves crossing its threads, a nut having a bore to receive said bolt and provided in its outer face with a series of integral tongues or spurs formed from the body of the nut and tapering from their outer to their inner ends with their opposite sides converging toward the inner ends or points of the sides and made of a maximum thickness at their inner pointed ends and gradually reducing in thickness thence toward their outer ends where they unite with the body of the nut, the spurs being seated when in locked position in corresponding recesses in the outer face of the nut, and the said nut being provided in its said outer face with lateral slots communicating with said recesses and adapted to receive punches or other suitable instruments by which the tongues or spurs may be readjusted to normal position, substantially as set forth.

2. A nut having a bolt opening and provided in its outer face with a series of integral tongues formed from the body of the nut and tapering from their outer to their inner ends with their opposite sides converging toward the inner ends or points of the sides and made of maximum thickness at their inner pointed ends and gradually reducing in thickness toward their outer ends where they unite with the body of the nut, the tongues being seated when in locked position in corresponding recesses in the outer face of the nut, and the said nut being provided in its said outer face with lateral slots communicating with said recesses and adapted to receive a punch or other suitable instrument by which the tongues may be readjusted to normal position.

3. A nut having a bolt opening provided in its outer face with a series of integral tongues or spurs formed from the body thereof and tapering from their outer to their inner ends and seated when in locked position in recesses in the face of said nut, said nut being provided in its said face with lateral slots communicating with the recesses and adapted to receive a punch or other suitable instrument by which the tongues may be readjusted.

4. A nut having a bolt hole and provided on its outer face with tongues, and with recesses receiving the tongues whereby the tongues may be pressed when in locked position into the recesses with their outer faces flush with the face of the nut, the body of said nut being slotted alongside the tongues to facilitate the readjustment of the tongues, substantially as set forth.

WALTER W. SENN.

Witnesses:
 JERMION FLEGAL,
 LAURENCE NUGENT.